United States Patent [19]

Park

[11] Patent Number: 4,794,270

[45] Date of Patent: Dec. 27, 1988

[54] STABILIZING CIRCUIT FOR SWITCHING MODE POWER SUPPLY CIRCUIT

[75] Inventor: Chan W. Park, Kyungsangbook-do, Rep. of Korea

[73] Assignee: Gold Star Co., Ltd., Seoul, Rep. of Korea

[21] Appl. No.: 64,000

[22] Filed: Jun. 19, 1987

[30] Foreign Application Priority Data

Jun. 20, 1986 [KR] Rep. of Korea ................ 4967/1986

[51] Int. Cl.[4] ...................... H02M 7/24; H02M 3/335
[52] U.S. Cl. .......................................... 307/17; 363/21
[58] Field of Search ...................... 307/11, 17; 363/20, 363/21

[56] References Cited

U.S. PATENT DOCUMENTS

| | | | |
|---|---|---|---|
| 3,676,768 | 7/1972 | Morret | 307/17 |
| 3,742,242 | 6/1973 | Mori et al. | 307/17 |
| 4,209,826 | 6/1980 | Priegnitz | 363/21 |
| 4,323,961 | 4/1982 | Josephson | 363/21 |
| 4,447,741 | 5/1984 | Moschopoulos | 307/31 |
| 4,686,616 | 8/1987 | Williamson | 363/21 |

Primary Examiner—Vit W. Miska
Attorney, Agent, or Firm—Birch, Stewart, Kolasch & Birch

[57] ABSTRACT

A switching mode power supply circuit designed to apply an operating power to the load when a relay connected to the remote control part is driven. The switch of the relay is connected to the base of the switching transistor, and the secondary winding of the transformer for making the electric power flow to the base of the switching transistor is connected to the terminals fixed on each side of the switch of the relay through the base current supply and absorption parts, respectively. Thereby, the base current of the switching transistor is varied in accordance with the driving state of the relay. The switching mode power supply circuit is operated stably regardless of the state where the operating power is applied only to the remote control part or the state where the operating power is applied to both the remote control part and the load.

2 Claims, 3 Drawing Sheets

STABILIZING CIRCUIT FOR SWITCHING MODE POWER SUPPLY CIRCUIT

FIELD OF THE INVENTION

The invention relates to a switching mode power supply circuit designed to apply a constant voltage to the load of an electronic apparatus having a remote control function regardless of the magnitude of input alternating current. In particular, a stabilizing circuit for a switching mode power supply circuit is designed to stably operate a switching mode power supply circuit regardless of the stand-by state that applies the operating power only to the remote control part of an electronic apparatus and the driving state that applies the operating power to both the remote control part and the load.

BACKGROUND OF THE INVENTION

The conventional switching mode power supply circuit is, as illustrated in FIG. 1, composed in such way that the output terminal of the rectifier 1 to which the alternating current is supplied, is connected to the collector of the switching transistor TR1 through the primary winding T11 of the transformer T1, to the diode D1 and the base of the said switching transistor TR1 through the resistor R1. The secondary winding T12 of the transformer T1 is connected to the base of the switching transistor TR1 through the resistor R2 and the condenser C1 and the secondary winding T15 is jointly connected through the rectifier 2 and the control part 5. The secondary winding T13 of the transformer T1 is connected to the remote control part 6 through the rectifier 3 and the relay RL1 is connected to the control terminal ClS of the remote control part 6. The secondary winding T14 of the transformer T1 is connected to the load 7 through the switch RL11 of the relay RL1 and the rectifier 4.

According to the composed conventional switching mode power supply circuit, when the alternating current AC is applied, the alternating current is, after rectified in the recitifer 1, applied to the primary winding T11 of the transformer T1 and at the same time to the base of the transistor TR1 through the resistor R1. Therefore, the blocking oscillation circuit comprising transistor TR1, the primary and secondary windings T11, T12 of the transformer T1, resistors R1, R2, condenser C1 and diode D1 begin to oscillate as the switching transistor TR1 turns on and off. Accordingly, the voltage produced in the primary winding T11 of the transformer T1 is induced and output to the secondary windings T12–T15.

At this moment, the electric current flows to the base of the switching transistor TR1 via the resistor R2 and the condenser C1 by the voltage induced to the secondary winding of the transformer T1. In a case where the switching transistor TR1 turns on, the electric current flowing to the primary winding T11 of the transformer T1 is gradually increased. When the current reaches hfe times the base electric current of the switching transistor TR1 (wherein hfe is the current amplification factor), the switching transistor TR1 turns off.

The voltage induced to the secondary winding T13 of the transformer T1 is rectified in the rectifier 3 and applied to the remote control part 6 as an operating power so as to operate the remote control part 6 by the remote control signal. Thus, when the remote control part 6 is driven, a control signal is output to the control terminal CS to which operates the relay RL1 and the switch RL11 so that relay RL1 is short-circuited. Consequently, the voltage induced to the secondary winding T14 of the transformer T1 is rectified in the rectifier 4 through the switch RL11 of relay RL1 and the voltage is applied to the load 7 as an operating voltage which is expressed in the following formula:

$$VO = \sqrt{\frac{Ro}{2L}} \times \frac{Ton}{\sqrt{T}} \times Vi$$

Wherein
- Vo is the operating voltage applied to the load 7,
- Ro is the impedance of the load 7,
- L is the impedance of the primary winding T11 of transformer T1,
- T is the ON/OFF cycle of the switching transistor TR1,
- Ton is the time for which the transistor TR1 stays in an ON state, and
- Vi is the output voltage of the rectifier 1.

In the above-described formula, the operating voltage Vo applied to the load 7 is varied depending on the impedance Ro of the load 7 and the output voltage Vi of rectifier 1. The secondary winding T15 is connected to the secondary winding T14 so that the voltage induced to the secondary winding T15 is varied in accordance with any changes of the voltage induced to the secondary winding T14. The voltage induced to the secondary winding T15 is rectified in the rectifier 2 and then applied to the control part 5. At this time, the control part 5 controls the base current of the transistor TR1 so that both the output voltage of the rectifier 2 and the predetermined reference voltage become equal in their magnitudes.

Accordingly, in the event that less base current from the transistor TR1 flows due to such control of the control part 5, the decrease in base current results in a shortening in the time for which the electric current flowing to the primary winding T11 of the transformer T1 reachs hfe times the base current of the transistor TR1 when the transistor TR1 turns on, and the time for which the transistor TR1 stays in ON-state is shortened. While in the event that more base current flows, the time in which the base current reaches hfe times, is lengthened, and the time in which the transistor TR1 stays in an ON state is also lengthened. Because an ON/OFF cycle of the transistor TR1 is controlled according to its base current, the magnitude of the voltage induced from the primary winding T11 to the secondary winding T14 of the transformer T1 is constant regardless of the impedance Ro of the load 7 and the output voltage Vi of rectifier 1, that is, the magnitude of the input alternating current, and a constant operating voltage is applied to the load 7.

The maximum capacity of electric power supplied to the power supply circuit is about several hundred watts, the voltage range of the alternating current is 90–270 V, and the frequency used exceeds to 20 KHz.

However, the above-mentioned conventional switching mode power supply circuit has the following problems depending on the standby state for applying the operating power only to the remote control part 6 and the driving state for applying the operating power to both the remote control part 6 and the load 7.

Supposing that the use of electric power for the remote control part 6 is 2W and the electric power use of the load 7 is 100 W, a large difference of about 30:1 in the ratio between Ton/√T takes place in which an alternating current of 90 V input and an operating power of 102 W is supplied to both the remote control part 6 and the load 7, and Ton/√T in which the alternating current of 270 V is input and 2 W is supplied only to the remote control 6.

Consequently, in a case where the operating power is applied only to the remote control part 6, the ON-time of the switching transistor TR1 becomes very short, and the frequency is also increased.

The voltage produced in the primary winding T11 is proportion to the winding ratio of the primary and secondary windings T11. T12 of the transformer T1 is induced to the secondary winding T12, and the magnitude of the voltage induced to the secondary winding T12 when the switching transistor TR1 turns on, and the values of the resistor R2 and the condenser C1 are set to output 100 W, the electric power use of the load 7, at the time of a 90 V alternating current input. Therefore, the voltage induced to the secondary winding T12 when an alternating current AC of 270 W is input, becomes three times greater than to a case where the alternating current of 90 V is input, and the base current of the transistor TR1 is also increased by three times.

Accordingly, in the event that the operating power is applied only to the remote control part 6 and not to the load 7 when the alternating current of a high voltage is input. There are disadvantages in that because it is very difficult to control that the control part 5 controls the base current of switching transistor TR1, the output voltage is not maintained constantly. As the frequency is greatly increased, it is required to use a switching transistor TR1 having an excellent switching characteristic, and in a case where the switching characteristic of the switching transistor TR1 is not excellent, a parasittic oscillation, etc. takes place and thereby the operation of circuit becomes very unstable, and the switching transistor TR1 is destroyed.

SUMMARY OF THE INVENTION

The object of the invention is to provide a stabilizing circuit for the switching mode power supply circut, in which the switching mode power supply cercit is operated stably (period) a constant voltage is output regardless of the stand-by state for applying the operating power only to the remote control part and the driving state for applying the operating power to both the remote control part and the load.

According to the invention, the object is attained by such a manner that the switch of relay connected to the control terminal of the the remote control part is connected to the base of the switching transistor, and the terminals fixed on each side of the relay switch are connected jointly to the secondary winding of the transformer for making the electric current flow to the base of the switching transistor through the base current absorption part and the base current supply part, respectively. Thereby, the electric current flowing to the base of the switching transistor is varied according to the stand-by state for applying the operating power only to the remote control part and the driving state for applying the operating power to both the remote control part and the load.

The present invention is characterized by the standby state in which the operating power is applied only to the remote control part. In the stand-by state, the electric current flowing to the base of the switching-transistor is absorbed and reduced considerably in the base current absorption part as compared to the driving state in which the operating power is applied to the remote control part end the load, so tha it is possible to smoothly control the ON/OFF cycle of the switching transistor. Thereby, it is required to use a switching transistor having an excellent switching characteristic with the occurrence of the parasitic oscillation being prevented, and an induced voltge of the transformer being applied as an operating power to the remote control part and the load being constantly stabilized and maintained.

BRIEF DESCRIPTION OF THE DRAWINGS

Embodiments of the invention will now be described in more detail, by way of example, with reference to the accompanying drawings. In the drawings.

DETAILED DESCRIPTION OF THE PREFERRED EMBODIMENTS

Figure 1:
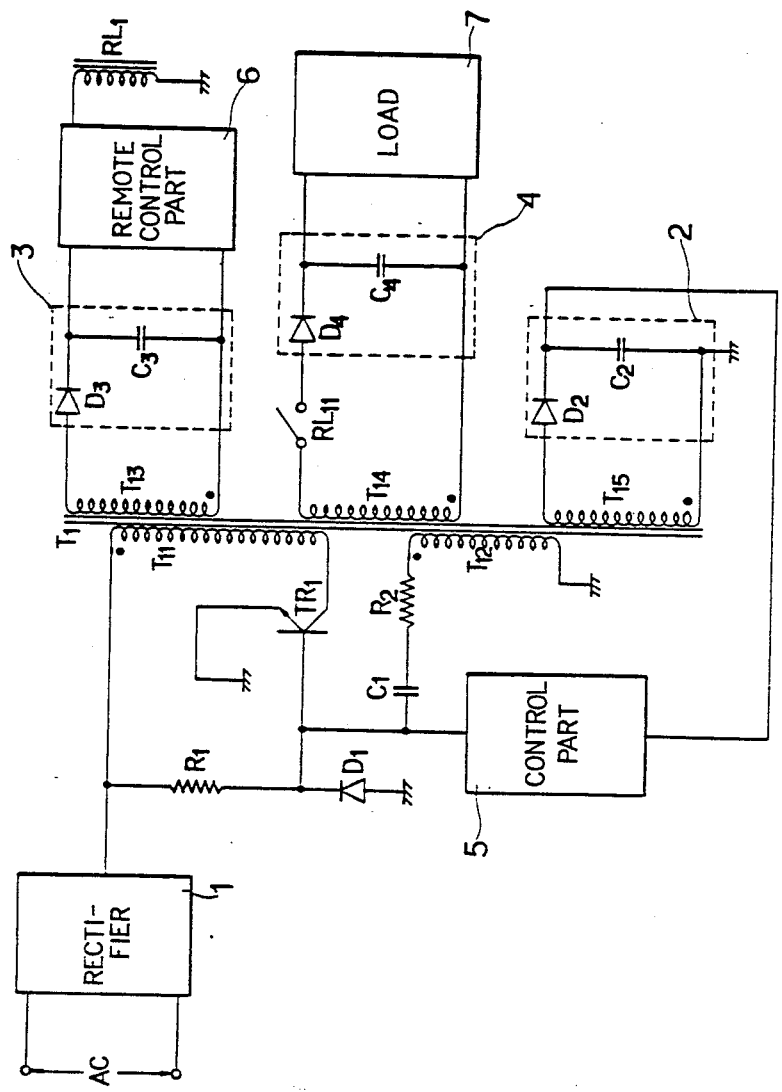
FIG. 1 is a conventional switching mode power supply circuit diagram.
Figure 2:
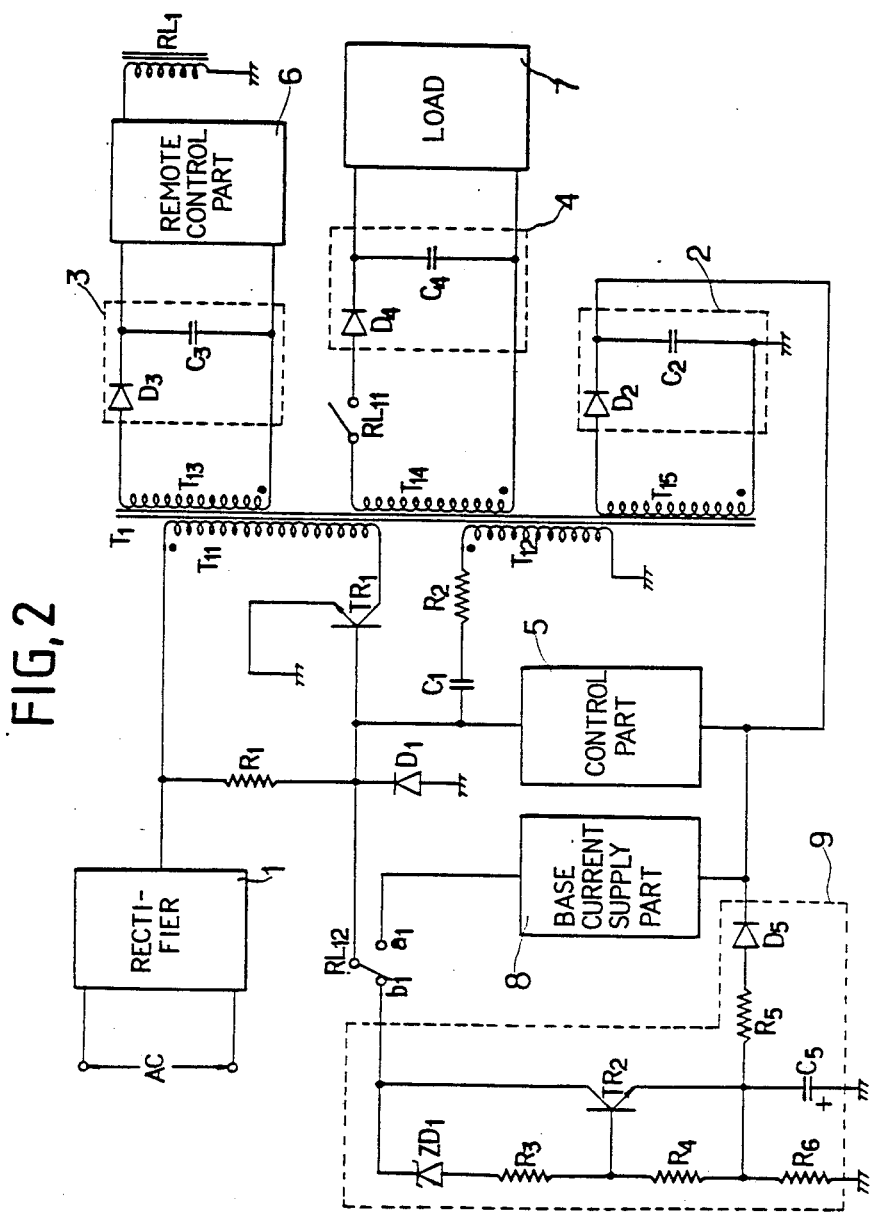
FIG. 2 is a switching mode power supply circuit diagram provided with a stabilizing circuit according to the invention.

As is shown in FIG. 2. which is the switching mode power supply circuit diagram provided with the stabilizing circuit according to one embodiment of the invention, the switching mode power supply circuit in which the output voltage of the rectifier 1 is applied to the blocking oscillation circuit comprising the primary and secondary windings T11, T12 of the transformer T1, switching transistor TR1, resistor R1, R2, condenser C1 and diode D1. The voltage induced to the secondary winding T13 of the transformer T1 is applied to the remote control part 6 through the rectifier 3, and the voltage induced to the secondary winding T14 is applied to the load 7 through the switch RL11 of relay RL1 that is connected to the control terminal CS of the said remote control part 6 and the rectifier 4. The voltage induced to the secondary winding T15 controls the base current of the switching transistor TR1 through the rectifier 2 and the control part 5, and is composed in such a way that the switch RL12 of the relay RL1 is connected to the base of the switching transistor TR1. The terminal b1 is fixed on one side of switch RL12 of the relay RL1 that is connected to the collector of the transistor TR2 and to the base of the transistor TR2 through the Zener diode ZD1 and the resistor R3. This connecting point is connected jointly to the emitter, resistor R6 and condenser C5 of the transistor TR2 through the resistor R4. This connecting point is connected to the secondary winding T12 of the transformer T1 for making the electric current flow to the base of the switching transistor TR1 through the resistor R5 and the diode D5. The terminal a1 fixed on another side of the switch RL12 of the relay RL1 is connected to the secondary winding T12 of the said transformer T1 through the base current supply part 8, wherein the part comprising Zener diode ZD1, resistors R3–R6, transistor TR2, condenser C5 and diode D5 is the base current absorption part 9. The switch RL11 of the relay RL1 is designed to be shortcircuited when the relay RL1 is driven, and to be open when the relay RL1 is not driven. The switch RL12 of the relay RL1 is designed to be short-circuited to the terminal al fixed on one side when the relay RL1 is driven, and to the terminal bl fixed on the other side when the relay R1 is not driven.

The operational effect of the composed invention will now be described in detail.

When the alternating current AC is input, the AC current is rectified in the rectifier 1 and output. As the blocking oscillation circuit comprising the primary and secondary windings T11, T12 of the transformer T1, switching transistor TR1, resistors R1, R2, condenser C1 and diode D1 is oscillated, the voltage produced in the primary winding T11 is induced to the secondary windings T12–T15, and the voltage induced to the secondary winding T13 is rectified in the rectifier 3 and applied as an operating power to the remote control part 6. While the voltage induced to the secondary winding T15 is rectified through the rectifier 2 and then applied to the control part 5 so that the control part 5 controls the base current of the switching transistor TR1 in proportion to the magnitude of the applied voltage and thereby controls the ON/OFF cycle of the switching transistor TR1.

For such an operation, in a stand-by state when a remote control signal is not applied to the remote control part 6 and the relay RL1 is not driven, the switch RL11 of relay Rl1 is open so that an operating power is not applied to the load 7, and the switch RL12 of relay RL1 is short-circuited to the terminal bl fixed on the other side.

Figure 3:
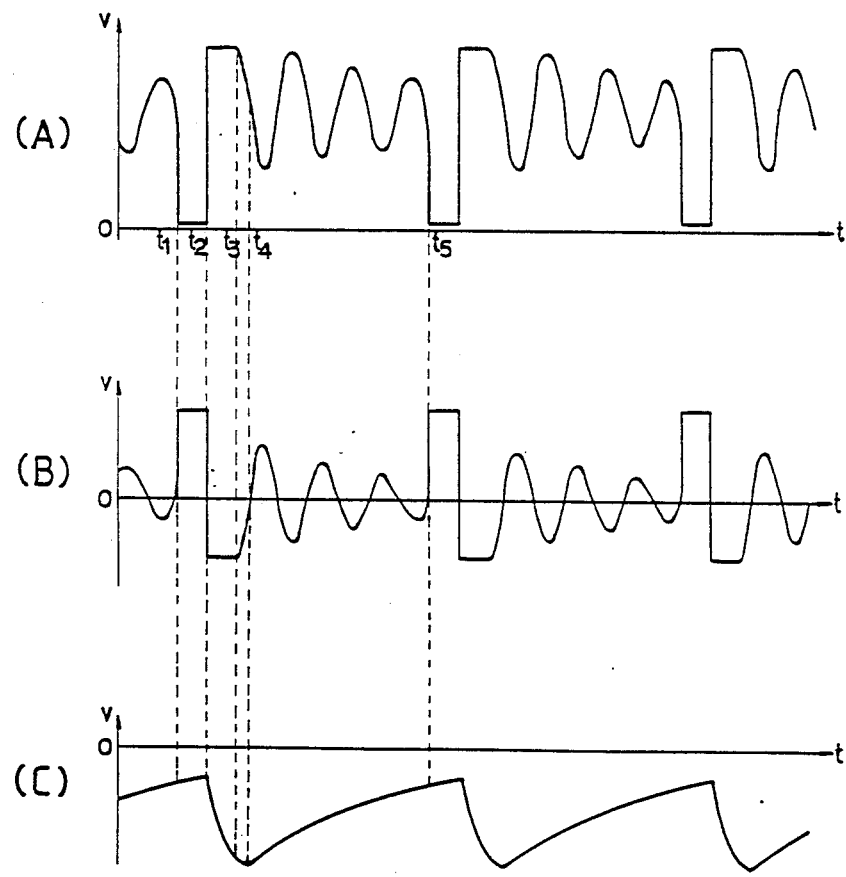
FIGS. 3(A), 3(B), and 3(C) are timing diagrams of the voltage for the secondry winding T12 of the transforer T1.

At this moment, when the electric current flows to the base of switching transistor TR1 through the resistor R2 and the condenser C1 by the voltage induced to the secondary winding T12 of the transformer T1, the switching transistor TR1 turns on and its collector voltage becomes a low potential as illustrated in (A) of FIG. 3. At this time t1, a constant current flows to the primary winding T11 of the transformer T1 so as to induce a positive voltage (t1–t2 section) to the secondary winding T12 of the transformer T1 as illustrated in (B) of FIG. 3. When the electric current flowing in the time t2 to the primary winding T11 of the transformer T1 reaches hge times the electric current flowing to the base of the switching transistor TR1 and thereby the switching transistor TR1 turns off, the collector voltage of the switching transistor TR1 becomes a high potential as illustrated in (A) of FIG. 3. At this moment, accordingly, a negative voltage is induced to the secondary winding T12 of the transformer T1 as illustrated in (B) in FIG. 3, and this negative voltage is charged in the condenser C5 through the diode D5 and the resistor R5 of the base current absorption part 9 as illustrated in (C) of FIG. 3. On the other hand, when the magnetic energy accumulated in the primary winding T11 of the transformer T1 is discharged completely in the time t3, the collector voltage of the switching transistor TR1 is dropped as illustrated in (A) of FIG. 3, and the positive voltage is again induced to the secondary winding T12, and the electric current flows to the resistor R2 and the condenser C1 by the induced positive voltage. However, since the Zener diode ZD1 turns on by the negative voltage charged in the condenser C5 of the base current absorption part 9, and thereby the bias voltage is applied to the base of the transistor TR2. Consequently, the positive voltage induced to the secondary winding T12 of the transformer T1 and passed through the resistor R2 and the condenser C1 is absorbed in the condenser C5 through the switch RL12 of the relay RL1 and the transistor TR2 so that the switching transistor TR1 is maintained in an OFF state.

When the voltage charged in the condenser C5 is discharged at the time t5 in a state below the Zener voltage of the Zener diode ZD1, the transistor TR2 turns off and the electric current flowing through the resistor R2 and the condenser C1 is accordingly applied to the base of switching transistor TR1 so as to turn on the switching transistor TR1, and subsequently the above-described operation is repeated.

Finally, in the stand-by state in which the relay RL1 is not driven, an operating power is not applied to the load 7, and the ON/OFF cycle of the switching transistor TR1 is set by the discharge correction time of the condenser C5 of the base current absorption part 9. Accordingly, the control part 5 easily controls the base current of the switching transistor TR1 in such a manner that the rectified voltage of the rectifier 2 is coincident with the reference voltage set in the control part 5, and the switching action of the switching transistor TR1 is stably carried out in the proper frequency.

In a state in which the external remote control signal is applied to the remote control part 6 and thereby the relay RL1 is driven, the seitch RL11 of relay RL1 as shortcircuited and the voltage induced to the secondary winding T14 of the transformer T1 is rectified in the rectifier 4 through the switch RL11 of the relay RL1 and then applied as an operating power to the load 7. Likewise, in the driving state in which the relay RL1 is driven and thereby the operating power is applied to the load 7, the switch RL12 of the relay RL1 is short-circuited to the terminal al fixed on one side. Consequently, the base current absorption part 9 no longer affects the base current of the switching transistor TR1, and the voltage induced to the secondary winding T12 of the transformer T1 as described above makes a sufficient base current flow to the switching transistor TR1 through the base current supply part 9 and the switch RL12 of the relay Rl1, and operates accordingly in the same way as the switching mode power supply circuit.

As described above, the invention has the effect in that in the stand-by state in which the operating power is applied only to the remote control part, the ON/OFF cycle of the switching transistor is determined by absorbing the base current of the switching transistor through the base current absorption part. Thereby, it is possible to control the base current of the switching transistor by the control part so as to conform to the stand-by state. Further, a switching transistor having excellent switching characteristics with parasitic oscillation taking place is not required for stabilizing the output voltage of the transformer.

What is claimed is:

1. A switching mode power supply means having voltage stabilizing means for supplying a constant voltage to a load of an electronic apparatus, comprising:
    blocking oscillator means for inducing voltage to a plurality of secondary transformer windings in response to a rectified input voltage;
    first rectifier means for rectifying a voltage induced in a first winding of said plurality of secondary transformer windings and applying the rectified voltage of said first rectifier means to a remote control means;
    switching relay means for developing a first signal when the rectified voltage of said first rectifier means is induced and a second signal when the rectifier voltage of said second rectifier means is not induced;

second rectifier means for rectifying a voltage induced in a second winding of said plurality of secondary transformer windings and applying the rectified voltage of said second rectifier means to the load in response to said first signal of said switching relay means;

third rectifier means for rectifying a voltage induced in a third winding of said plurality of secondary transformer windings;

base current supply means for applying the rectified voltage of said third rectifier means to said blocking oscillator means only in response to said first signal of said switching relay means; and base current absorption means for reducing and applying the rectified voltage of said third rectifier means to said blocking oscillator means only in response to said second signal of said switching relay means;

whereby a constant voltage is supplied to the load regardless of voltage induced by said blocking oscillator means.

2. The switching mode power supply means of claim 1 wherein said blocking oscillator means includes a primary transformer winding, a fourth winding of said plurality of secondary transformer windings, a switching transistor, first and second resistors, a capacitor and a diode; and said switching transistor is connected to said base current supply means or said base current absorption means in response to said switching relay means.

* * * * *